May 5, 1936. E. E. WOODWARD 2,039,507
DIESEL ENGINE GOVERNOR
Filed Dec. 4, 1933 6 Sheets-Sheet 1

May 5, 1936.  E. E. WOODWARD  2,039,507
DIESEL ENGINE GOVERNOR
Filed Dec. 4, 1933  6 Sheets-Sheet 3

May 5, 1936.  E. E. WOODWARD  2,039,507
DIESEL ENGINE GOVERNOR
Filed Dec. 4, 1933  6 Sheets-Sheet 6

Fig. 6

Inventor:
Elmer E. Woodward
By Wilson, Dowell,
McCanna & Wintercorn
Attys.

Patented May 5, 1936

2,039,507

UNITED STATES PATENT OFFICE 2,039,507

DIESEL ENGINE GOVERNOR

Elmer E. Woodward, Rockford, Ill., assignor to Woodward Governor Company, Rockford, Ill., a corporation of Illinois Application December 4, 1933, Serial No. 700,760

24 Claims. (Cl. 264—3)

This invention relates to governors generally, the present embodiment being a Diesel engine governor.

The internal combustion engine, although one of the quickest responding of all prime movers, has not been used in power plants to the extent that would be expected considering its suitability, and this has undoubtedly been due to unsatisfactory speed regulation obtainable with the conventional type of flyball governors. It is, therefore, one object of the present invention to provide a governor suitable for these engines embodying characteristics to assure satisfactory unit operation and parallel operation of like units, also parallel operation with other types of prime movers.

Conventional flyball governors are direct acting and not only indicate speed but also serve as a source of energy to control the engine fuel pump delivery and all intervening mechanical connections. It follows, therefore, that a corrective fuel change requires quite a sizable change in speed or frequency in order to produce the force required to overcome friction in the parts to be moved. It is also necessary that the conventional governors be designed with a large inherent speed variation from no load to full load, known as speed droop, to insure stability and anti-hunting, and, in addition, generally a simple damping dashpot is necessary to further prevent hunting. Speed or frequency changes of the order of .175% are required to cause governor response. According to the present invention, flyballs of comparatively small size are utilized merely to indicate speed and they transmit the speed indication to a small pilot valve that is nicely balanced hydraulically, and the pilot valve in turn controls the flow of oil under pressure to move the power piston used for manipulating the fuel feed control. In this way, much more delicate speed regulation is made possible; speed changes of less than .01% will cause corrective movement of the fuel feed control.

Conventional flyball governors can be said to have fixed characteristics, considering that, with exception of speed adjustment, no provision is ordinarily made for adjustment of such governors while in operation. The governor of my invention, on the other hand, is constructed so as to permit various kinds of adjustment during the operation of the governor and accordingly affect the operation of the controlled unit or units. One of these is the load limit adjustment for limiting the maximum load on the engine to any predetermined value. This adjustment may be used to shut the engine down by turning the pointer to zero. Another adjustment is that for speed droop in which the pointer indicates the desired percentage of difference between no load and full load speed. Still another adjustment is the synchronizer, the turning of which will speed up or slow down the engine without load change, this being a speed adjustment if the engine is operating alone, and a load adjustment if the engine is operating in parallel with other units. In accordance with the present invention, the mechanism has its various parts arranged for compactness and so as to make it feasible to enclose the same within a housing of moderate size and various dials and adjusting knobs and pointers cooperating therewith are provided on a front panel of the governor housing to manipulate the various adjustments conveniently and enable the operator, at a glance, to note the various readings significant of the operation of the prime mover being governed.

The invention is illustrated in the accompanying drawings, in which—

The same reference numerals are applied to corresponding parts throughout the views.

Figure 1:
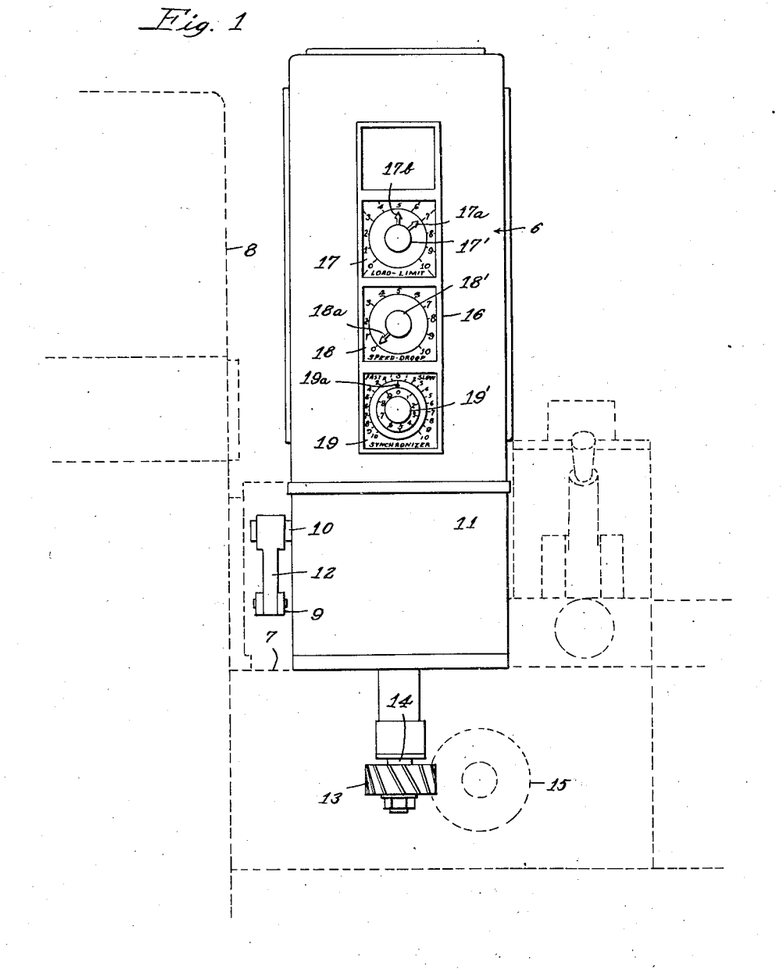
Figure 1 is a front view of a typical governor installation made in accordance with my invention.

Referring briefly to Figure 1, the numeral 6 designates the governor which is mounted on a ledge 7 on one side of an engine 8, which may be any internal combustion engine, although, in the present instance, the same happens to be a Diesel engine. The fuel injector is not shown, only the end of a link 9 which through other mechanism, not shown, is arranged to shift a fuel pump inlet cam, or its equivalent, whereby to control the feeding or injection of fuel to the engine. 10 is a shaft projecting from the housing 11 of the governor and arranged to be turned in one direction or the other to increase or decrease the fuel delivery, the shaft being connected with the link 9 by a lever 12. The mechanism in the housing 11 for operating the shaft 10 is schematically shown in Figs. 2 to 5, and in its actual arrangement in Fig. 6, and will be described in detail hereinafter. At 13 is shown a spiral gear on the end of a shaft 14 extending downwardly from the governor. This gear meshes with another gear 15 driven in any suitable way from the engine crank shaft, whereby to drive the governor shaft 14 at a speed in a fixed relationship to the engine speed. The housing 11 of the governor has a front panel 16 on which there are three dials 17—19 for "load limit", "speed droop" and "synchronizer", respectively. Three knobs 17'—19' extend from the panel 16 at the centers of the dials, and pointers 17a—19a turn with these knobs to indicate the settings by reference to the dials. There is a second pointer 17b cooperating with the dial 17 but turning independently of the knob 17' and pointer 17a to indicate the position of the fuel control cam. While knobs are shown for direct manual operation, it should be understood that the invention is not to be regarded as limited to such control, inasmuch as governors of this kind are frequently manipulated by remote control, using a universal split field, series wound motor. Such remote control is particularly desirable in the case of the synchronizer adjustment, instead of the knob 19'. Furthermore, while the governor 6 is shown in connection with a Diesel engine, it will be understood that it may be used in connection with any internal combustion engine, or other prime mover.

In Figs. 2 to 5, all of the shafts carrying levers, links, etc., and which are suitably supported in bearings in the housing 11 of the governor, have for the sake of convenience been identified by cross-hatching the visible ends thereof. All other shafts, as will presently appear, are floatingly mounted. In these views, 20 designates a gear pump, one of whose gears is fixed on the upper end of the shaft 14 and the other of whose gears is fixed on the lower end of a shaft 21 for driving the governor head 22. Flyballs 23 are carried on bell cranks 24 pivotally mounted on the head and constitute the speed measuring or weighing elements. The position of these flyballs determines the position of the push and pull rod 25 which is movable downwardly by the levers 24 against the action of a return spring 26. A tilt lever 27 has pivotal connection with the rod 25 at 28 and with another rod 29 at 30 and with the small plunger 31 of a dashpot 32 at 33. The rod 29 has pivotal connection at 34 with a tilt lever 35 which in turn is pivoted at 36 on the upper end of a pilot valve plunger 37. This pilot valve is a four-way valve and has the plunger 37 reciprocable in a ported bushing to control the delivery of oil under pressure from a pipe 38 into either one of two passages 39 and 40 communicating with the opposite ends of a cylinder 41 of a servomotor, the piston 42 of which is the power piston for shifting the fuel feed cam. When the valve 37 is moved downwardly, oil is delivered through passage 39 to move the piston to the right, oil being discharged from in front of the piston through passage 40. When the valve 37 is raised, the piston 42 is moved to the left by reason of delivery of oil through passage 40, oil being discharged from in front of the piston under these circumstances through passage 39. The piston is connected by a rod 43 to a bell crank 44 fixed on the shaft 10, previously referred to, and it is, therefore, obvious that the shaft will be turned clockwise by movement of the piston to the left and counterclockwise by movement of the shaft to the right. Movement to the right decreases fuel feed and movement to the left increases fuel feed. The pump 20 has the discharge side thereof communicating with the pipe 38 for the delivery of the oil under pressure to move the piston, but when the plunger 37 is in neutral position, the oil under pressure is exhausted through a relief valve 45 into the sump indicated by the letter S. It is from this sump that the pump 20 draws its oil through an intake 46. This sump also receives oil exhausted from the servomotor. There is, in other words, available at all times oil under constant pressure as the source of power to be relied upon for movement of the power piston, and this movement is merely controlled by the flyballs 23 which actuate the pilot valve 37, as distinguished from the conventional direct acting governor in which the flyballs serve as the source of energy in the movement of the fuel feed cam and all intervening mechanical connections. The fact that the flyballs merely indicate speed and transmit the indication to the pilot valve is, in itself, enough to account for the fact that a comparatively small speed or frequency change is sufficient to cause governor response. However, notice that the pilot valve 37 is hydraulically balanced so that no perceptible force is required to shift the same, and also that a light compression spring is provided under the valve plunger to counterbalance its weight, and thus make for even more sensitive actuation. This construction accounts for the fact that speed changes of less than .01% will cause corrective movement of the fuel feed cam, as compared with speed changes of about .175% required to cause response in the conventional direct acting flyball governors.

The position of the fuel feed cam, being dependent upon the position of the piston 42, can be indicated by means actuated by the bell crank 44. Thus, there is shown a link 47 connecting the member 44 with a lever 48 fixed on a compensating crank shaft 49 suitably mounted for oscillation in bearings in the governor housing. An eccentric 50 on the shaft 49 is arranged to tilt a lever 51 on a fulcrum 52, whereby to correspondingly oscillate a gear sector 53 meshing with a pinion 54 on which the pointer 17b is carried. It is obvious, therefore, that as the piston 42 is moved to the right to decrease fuel feed, the pointer 17b will be swung in a counterclockwise direction relative to the dial 17 to register the decrease in fuel feed, and vice versa. This pointer 17b is useful also as an indicator of economical engine operation; for example, if for a given load the pointer 17b shows increased fuel consumption, there must be something wrong in the engine or else the grade of fuel oil being used is inferior.

Figure 4:
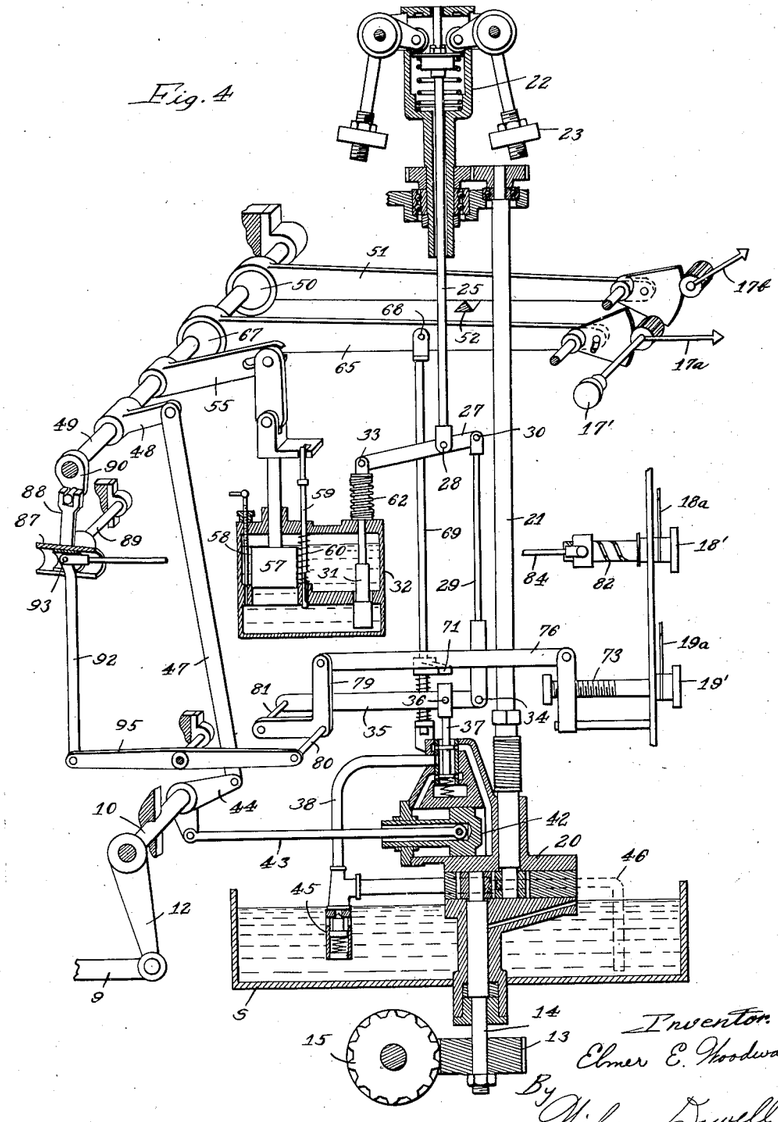

Speed stability or anti-hunting is obtained by temporarily modifying the length of the connection between the flyballs and the pilot valve 37, the modification being proportional to the time rate of change of fuel setting. This temporary modification of the action initiated by the flyballs is termed "compensation", which accounts for the naming of the shaft 49 the "compensating crank shaft". The dashpot 32 is also termed the "compensating dashpot". Its action is very brief and occurs only during the time that the governor is making a correction in the setting of the fuel feed cam. In the present governor, both the magnitude and duration of compensation are adjustable to suit operating conditions of the particular installation, and adjustments are made at the time the unit is installed. The shaft 49 has a lever 55 thereon adjustably connected by link 56 with a large plunger 57 in the dashpot 32, so as to permit slight variation in the stroke of the plunger for a given angular movement of the shaft. A needle valve 58 regulates the by-passing of oil between the upper and lower chambers of the dashpot, and it is manually adjustable. Another by-pass valve 59 is held normally in closed position by a spring 60 but is arranged to be opened by downward movement of a tappet 61 on the outer end of the rod of the large plunger 57. A coiled compression spring 62, which is shown in uncompressed condition in Fig. 2, is arranged when compressed as shown in Fig. 4, by reason of downward movement of the plunger 31, to tend to return said plunger to its normal position.

Figure 2:
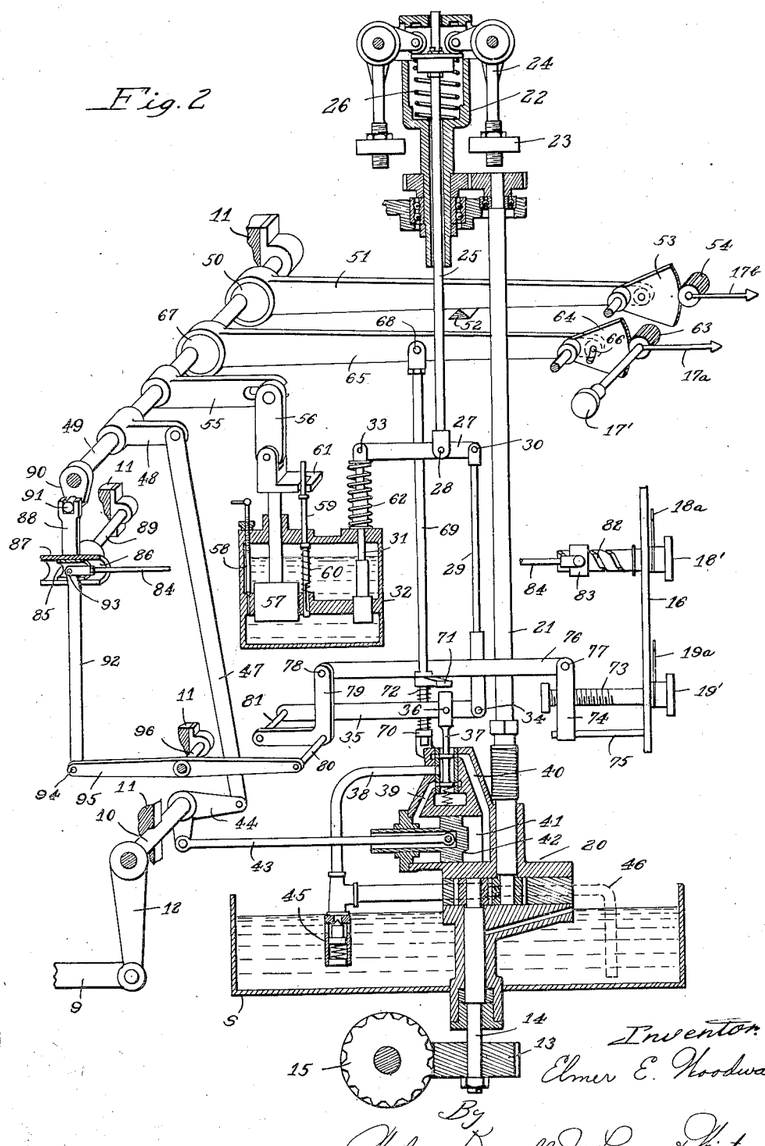
Figs. 2 to 5 are schematic drawings of the governor mechanism showing the parts in the different stages of a governing cycle, in this case for decrease in fuel feed to maintain a given speed upon lessening of load on the engine.
Figure 3:
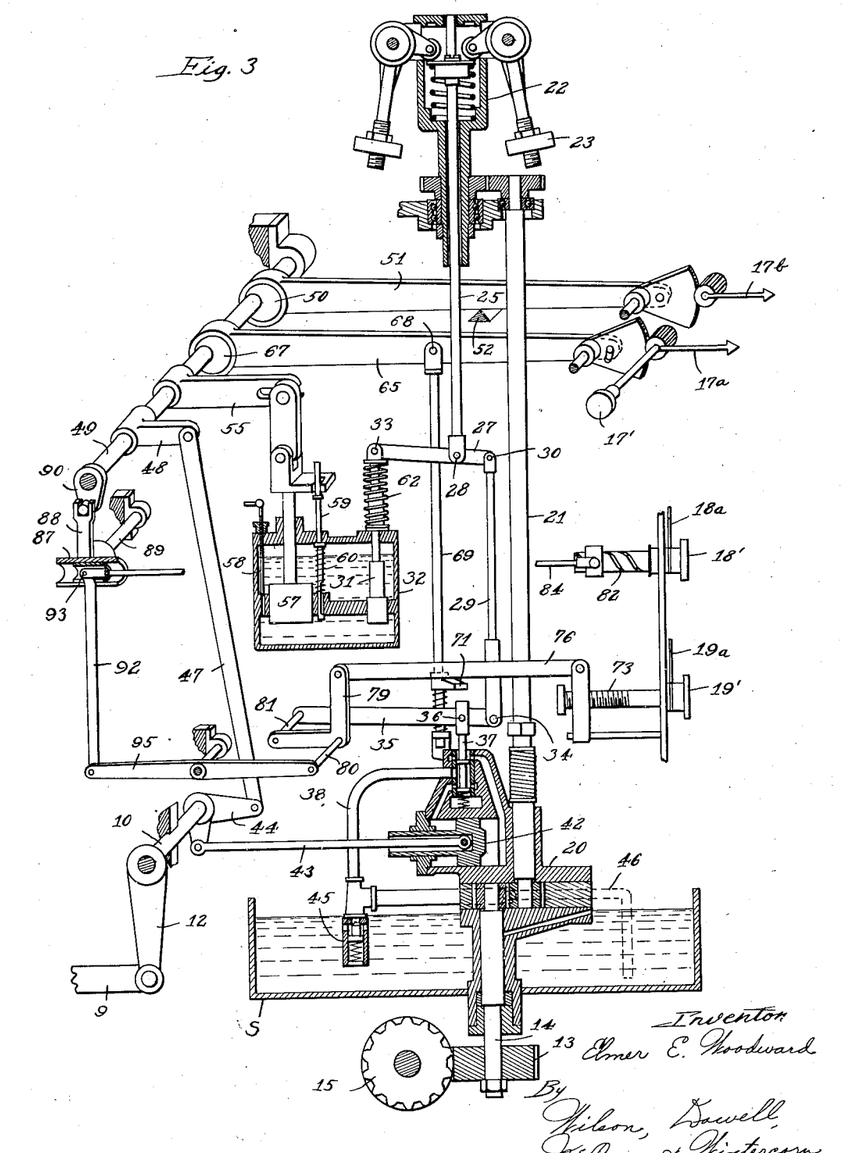
Figure 5:
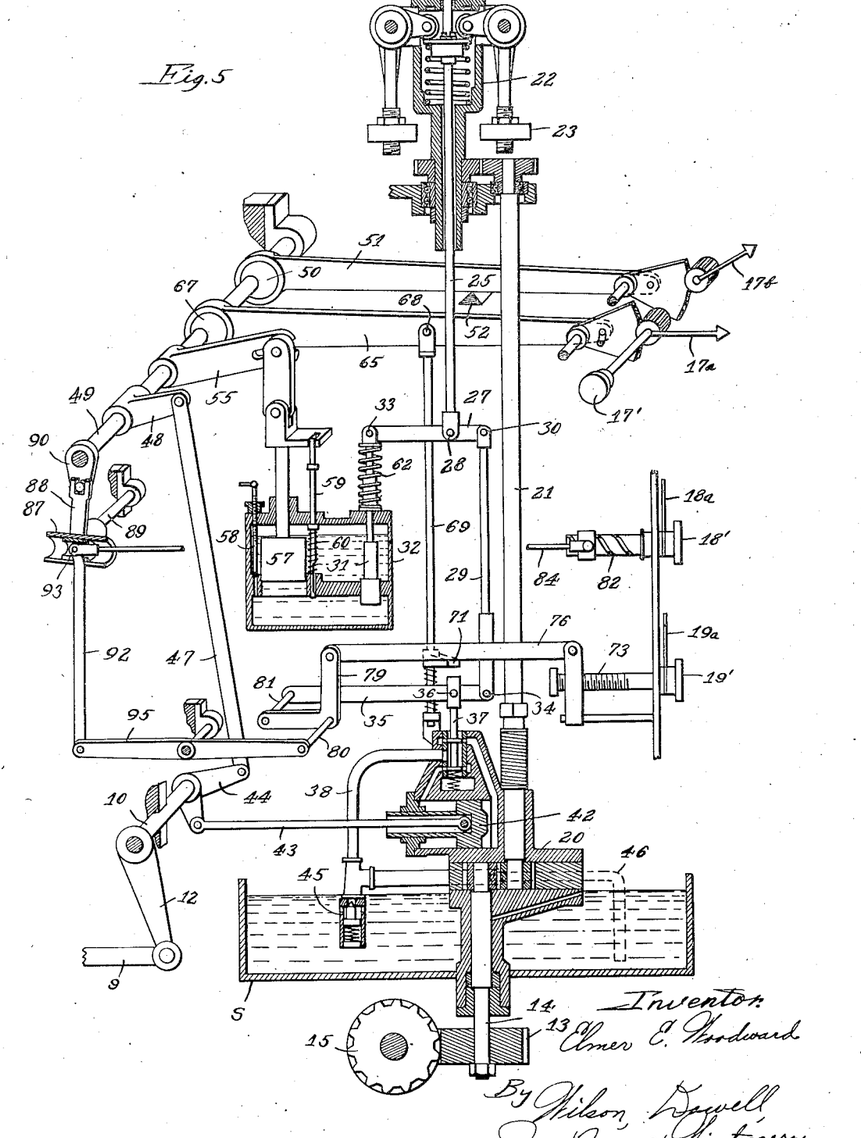

The operation of the governor mechanism, as thus far described, is readily understandable from a study of Figs. 2 to 5, which show the parts in different positions at various stages of a complete differing cycle. Thus, Fig. 2 shows the flyballs 23 in a given position with the pilot valve 37 in neutral position, and the piston 42 at a standstill for a certain fuel feed, and we may assume that the engine controlled by the governor is operating under a given load. Now, assuming that a certain amount of load is removed, the engine begins to speed up and the flyballs 23 move outwardly, as shown in Fig. 3. This outward movement of the flyballs results in downward movement of the speeder rod 25, thereby forcing the pivot points 28, 30, 34 and 36 downward, and, consequently, also the pilot valve 37. The pilot valve, therefore, admits oil under pressure through passage 39 into cylinder 41, and the piston 42 moves to the right, which is the proper direction to diminish the amount of fuel going to the engine. The oil in front of the piston flows out through passage 40 to the sump S. Now, turning to Fig. 4, it follows that when the piston 42 moves to the right, the rod 47 is pushed upward and turns the shaft 49 counterclockwise. The pointer 17b is accordingly swung in a counterclockwise direction to register a decreased fuel feed, and lever 55 is at the same time moved so as to lift the plunger 57. In view of the fact that the dashpot is filled with oil, the small plunger 31 is sucked downwardly against the action of spring 62 by the upward movement of plunger 57, lowering point 33, and, since rod 25 is temporarily stationary, raising points 30, 34 and 36 so as to bring the pilot valve 37 to a central neutral position and stop the flow of oil into cylinder 41. The piston 42 necessarily stops as soon as the flow of oil is cut off. The movements of the various governor parts, being properly proportioned, will cause the piston 42 to stop when the flow of fuel to the engine has been reduced the amount necessary to bring the speed of the engine back to what is normal for the reduced amount of load. The fuel flow has now, therefore, been reduced the proper amount, the pilot valve 37 is in neutral position and the piston 42 is at a standstill, but the speed of the engine has not as yet actually returned to normal, because the engine does not respond quite as fast as the governor moves. The flyballs 23, therefore, are still in an outward position. The small dashpot plunger 31 is also below its central position so that the spring 62 is tending to return the plunger to central position. The action of the spring, combined with proper adjustment of the valve 58 will cause the small dashpot plunger to return to normal central position in a certain definite time and at the same rate that the engine speed returns to normal. As the flyballs 23 move inward, as shown in Fig. 5, the speeder rod 25 is raised. The point 33 will also raise at the same time and consequently points 30, 34, and 36 will not be disturbed, and the pilot valve 37 will remain centered so that the engine will not race. Fig. 5, in other words, illustrates the completion of the governing cycle with the small dashpot plunger 31 centered, the pilot valve 37 in neutral position, and the piston 42 at a standstill awaiting another change in load on the engine. In passing, it should be understood that if the load on the engine were increased instead of decreased, the reverse of what has been described above would take place, the flyballs 23 would move inwardly instead of outwardly, and the piston 42 would be moved to the left to increase the fuel feed. It is in this kind of operation that the valve 59 is opened in the downward movement of the plunger 57 to allow quick by-passing of oil from one chamber to the other in the dashpot. I shall now describe the various adjustments to which reference was made briefly in the course of the description of Figure 1.

*Load limit*

The knob 17' which turns the pointer 17a relative to the load limit dial 17, turns a pinion 63 to oscillate a gear sector 64 meshing with the pinion. A lever 65 which has a pin and slot connection with the sector 64, as indicated at 66, has a crank connection at its opposite end with the shaft 49 through an eccentric 67. The lever 65 is pivotally connected intermediate its ends at 68 with a rod 69, the lower end of which is slidable in a guide 70 adjacent the pilot valve 37 on the servomotor. A tappet 71 projects from the rod 69 for engagement with the end of the valve stem, and a compression spring 72 acts between the guide 70 and the tappet to normally return the rod 69 to the elevated position shown.

In operation, let us assume that the speed of the engine is normal with the engine about half loaded, and let us assume further that the knob 17' has been turned to set the load limit for ¾ load. Then, if an additional load is thrown on the engine, the speed begins to drop and the governor immediately begins to increase the flow of fuel to the engine in an attempt to bring the engine back to normal speed. As the piston 42 moves to the left to increase the fuel flow, the shaft 10 is turned clockwise so that the compensating crank shaft 49 is correspondingly turned clockwise. The left end of the load limit lever 65, due to the eccentric 67, is lowered, thereby forcing the rod 69 downwardly so as to have the tappet 71 engage the pilot valve 37 and move it to neutral position, stopping the governor movement just as the fuel flow increases to the amount required for ¾ load. If the load continues to increase, the increase in load will have to be taken by other engines operating in parallel with the engine controlled by the governor, because the load limit will not permit this engine to take on any more load until the load limit knob 17' is moved beyond a ¾ load setting.

The load limit adjustment can be used for stopping the engine, by simply turning the knob 17' counterclockwise. In this way, the right end of the load limit lever 65 will be lowered, and the rod 69 forced down to move the pilot valve 37 below central or neutral position, thus causing the piston 42 to be moved to the right to reduce the fuel flow to the engine. In this movement of the piston 42 to the right, the compensating crank shaft 49 will be rotated counterclockwise by means of link 47, with the result that rod 69 will be raised and the tappet 71 withdrawn from the pilot valve 37 so that the same will be allowed to come back to neutral whenever the fuel flow has been reduced an amount corresponding to the setting of the pointer 17a, which, in complete shut down of the unit, would be zero.

Speed adjustment

The knob 19' for turning pointer 19a relative to the speed indicating or "synchronizer" dial 19 turns a screw 73 in a nut 74 that is held against turning by means of a guide 75 on which the nut is slidable. A link 76 is pivotally connected at one end as at 77 to the nut 74, and at its other end as at 78 to a bell crank 79. The latter is pivotally supported at 80 and has pivotal connection at 81 with the floating lever 35, previously mentioned, the same being pivotally connected, as shown, to the pilot valve 37.

In operation, the adjustment of the speed at which it is desired to have the engine operate is accomplished by means of the knob 19', or its equivalent remotely controlled member. If the screw 73 is turned clockwise, the nut 74 is moved to the right so as to turn the bell crank 79 in a clockwise direction about its pivot 80. As a result, the left end of the lever 35 is raised, and point 34, being temporarily stationary, will act as a fulcrum, so that the pilot valve 37 will be raised above center. The piston 42 will accordingly be moved to the left so as to increase the fuel flow and cause the engine to speed up until the flyballs 23 have moved outwardly sufficient to return the pilot valve 37 to its center position, and thus establish a new and higher operating speed, without change in load. Manifestly to lower the speed of the engine, the screw 73 should be turned in the opposite direction, that is, counterclockwise, whereby to move the pilot valve 37 downwardly for the reverse of the operation just described.

If the engine is operating in parallel with a number of other engines and its capacity is small relative to the total capacity of the combination of units, the synchronizer can be used to reduce the load on the one engine and force the other engines to take additional load, or it can be used to cause the particular engine to take load away from the other engines, providing all engines are operating on speed droop.

Speed droop

The knob 18' which turns pointer 18a relative to dial 18 turns a steep pitched screw 82 in a nut 83 that is connected by a rod 84 to a slide 85 reciprocable in a bore 86 in a cross-head 87 formed on a lever 88 pivotally supported in the governor housing, as at 89. A crank 90, fixed on the compensating crank shaft 49, has a crank pin 91 received in the forked upper end of the lever 88 whereby to oscillate the latter and the crosshead 87 when the shaft 49 is turned one way or the other. A link 92 is pivoted to the slide 85 at 93 on the same center as the connection for rod 84. The lower end of the link is pivoted at 94 to a rocker arm 95 pivotally supported in the governor housing, as at 96, and carrying the pivot 80, previously described, on the free end thereof, as shown. The pivot 93 is shown as coaxial with pivot 89, the setting being for zero speed droop. However, if the knob 18' is turned clockwise so as to move the pivot 93 to the right from the central position shown, it follows that a lever action is secured between the shaft 49 and the rocker arm 95, and the amount of movement of the arm 95 that will be secured will depend upon the extent the knob 18' is turned.

In operation, the speed droop adjustment is made to cause two or more engines operating in parallel to take their proportionate share of the total load. The adjustment, as we shall see, causes a permanent change in the length of the connection between the speeder rod 25 actuated by the flyballs 23 and the pilot valve 37 as a linear function of movement of the fuel feed cam from the zero fuel feed position. For example, let us assume that the knob 18' is turned a small amount in a clockwise direction so as to move the pivot 93 to the right from the central position shown. The point 94 will accordingly be raised and pivots 80 and 81 lowered. The pilot valve 37, as a result, will be lowered, and the piston 42 will start moving to the right to reduce the fuel flow. The compensating crank shaft 49 will consequently be rotated in a counterclockwise direction, and this will result in a lowering of point 93 and force link 92 downwardly. The pivots 80 and 81 will accordingly be raised so that the pilot valve 37 will be raised back to central position, leaving the piston 42 at a standstill with the engine speed established for a new and lower normal speed. This action, it will be noted, is similar to what has been described in connection with the synchronizer. The speed droop adjustment, however, makes a permanent and automatic change in the speed of the unit proportional to the setting of the speed droop knob 18' and the position of the piston 42. For example, supposing the knob 18' is set for a speed droop of one percent: Until it is changed, there will always be a droop in speed as fuel flow is increased amounting to one percent from no fuel to full fuel delivery. This occurs automatically. If there are two or more units operating in parallel and each is set for the same amount of speed droop, each will be forced to take its proportionate share of all load changes, because if one attempts to take on more than its proportionate share, its speed will be automatically lowered, and, as lowering speed results in dropping load, it will be forced back to its proper position in relation to the others so far as the assumption of load is concerned. In short, the position of the pointer 18a indicates the desired percentage of difference between no load and full load speed for the unit governor: the speed droop is not a characteristic of the engine or prime mover, but of the governor controlling it, and the speed droop characteristic naturally will depend upon the adjustment selected. While I have shown and described a construction affording zero and negative speed droop, it should be evident that positive speed droop is easily obtained by providing for the movement of point 93 the other way from neutral position. For example, it would only be necessary to have the screw 82 of such length that the necessary movement of nut 83 would be obtained in either direction from a position corresponding to neutral, or zero speed droop; the nut would, of course, be at the middle of the screw for neutral and would be movable to the right from neutral for negative speed droop, as above outlined, and to the left from neutral for positive speed droop.

In conclusion, it should be understood that movements of the various parts of the governor have been very much exaggerated in the drawings to make the operation more easily discernible. It should also be understood that while I have illustrated and described the three adjustments, namely, load limit, speed droop and synchronizer, many installations are made where only one or two of these adjustments are provided.

Figure 6:
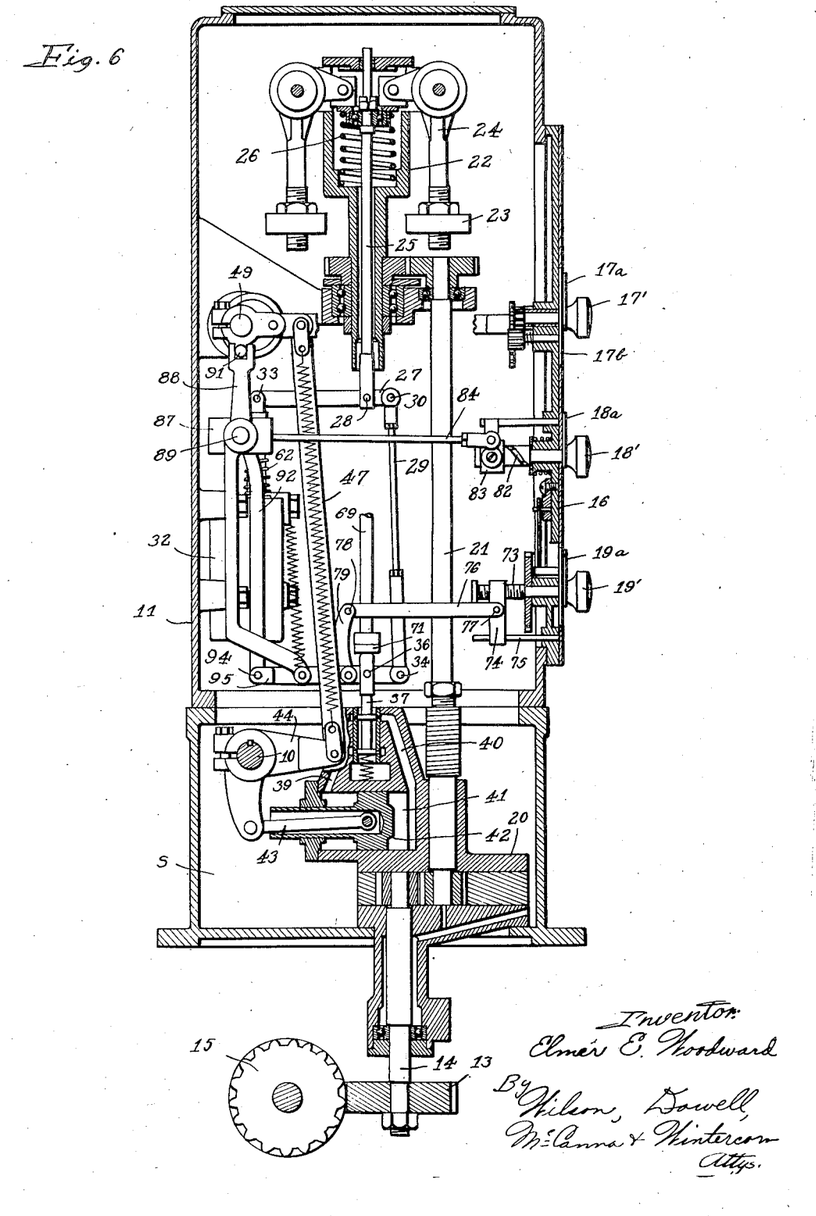
Fig. 6 is a central vertical section through the governor of Figure 1 to better disclose the arrangement of the various parts of the mechanism within the housing, and show how the dials are connected therewith.

It is apparent from the foregoing description of the load limit adjustment, speed adjustment and speed droop adjustment that they are all arranged for convenient manipulation and are incorporated in the governor mechanism without much complication and without sacrificing compactness, the entire mechanism together with the adjustments being housed within the moderate sized housing 11, as clearly appears in Fig. 6. The three adjustments referred to are vertically disposed above one another with the connecting parts that extend from the adjusting knobs arranged in substantially parallel lines, the load limit adjustment uppermost, the speed droop adjustment below, and the synchronizer or speed adjustment lowermost. This construction makes for neatness in appearance and convenience in reading the different adjustments.

It is believed the foregoing description conveys a good understanding of the objects and advantages of the invention. While reference is made only to Diesel engines, it is, of course, evident that the invention applies to any internal combustion engine. The appended claims have been drawn with a view to covering all legitimate modifications and adaptations.

I claim:

1. In combination, a centrifugal governor mechanism for a prime mover, a source of pressure fluid supply, a control cylinder containing a reciprocable regulator piston, a pilot valve arranged to be reciprocated by the governor mechanism to control the admission of fluid from said source to either end of said cylinder, linkage including a fulcrum lever providing an operating connection between the governor mechanism and the pilot valve, a compensating crank shaft, means whereby said shaft is turned in proportion to the movement of the regulator piston, means operated by the crank shaft for tilting the aforesaid fulcrum lever so as to move the pilot valve, and means operable during the operation of the prime mover and governor mechanism for adjusting the last-mentioned means for more or less movement of the pilot valve in a given angular movement of the compensating crank shaft.

2. A governor as set forth in claim 1 including a load limit scale, a setting knob, and a pointer manually adjustable by means of the setting knob relative to the load limit scale, a fulcrum lever connected at one end with the pointer so as to be shifted to different positions in the movement of the pointer, and operatively connected with the compensating crank shaft at the other end so as to be tilted in the turning of said shaft, and a pilot valve tappet disposed to engage the pilot valve to limit movement thereof in one direction, said tappet being operatively connected with the fulcrum lever intermediate the ends of the latter.

3. A governor as set forth in claim 1 including a speed indicating scale, an adjusting knob, and a pointer movable manually with the adjusting knob relative to the speed indicating scale, and means operable by the knob during the operation of the prime mover and governor mechanism for changing the tilt of the fulcrum lever associated with the pilot valve relative to the rest of the linkage connecting the governor mechanism with the pilot valve, whereby to change the speed of the prime mover.

4. In an engine fuel control, the combination of a fuel control member, a governor housing, an engine driven centrifugal governor mechanism in said housing, an engine driven source of pressure fluid supply, a cylinder containing a regulator piston operatively connected with the fuel control member, a pilot valve arranged to be reciprocated by the governor mechanism to control the admission of fluid from said source to either end of said cylinder, load limit and speed droop dials on the exterior of said housing, means in said housing operable during the operation of the governor mechanism and providing an adjustable operating connection between the governor mechanism and the pilot valve, and manually adjustable knobs movable relative to the load limit and speed droop dials and operatively connected with the last-mentioned means.

5. A control as set forth in claim 4 including a pointer movable relative to the load limit scale independently of movement of said knob to indicate fuel feed, and means operable in the movement of the reciprocable piston for communicating movement to said pointer.

6. In an engine fuel control, the combination of a fuel control member, a governor housing, an engine driven centrifugal governor mechanism in said housing, an engine driven source of pressure fluid supply, a cylinder containing a regulator piston operatively connected with the fuel control member, a pilot valve arranged to be reciprocated by the governor mechanism to control the admission of fluid from said source to either end of said cylinder, linkage in said housing providing an operating connection between the governor mechanism and the pilot valve, the linkage including a tiltable fulcrum lever whereby the length of said connection may be varied according to the position of angularity of said fulcrum lever, a speed indicating scale on said housing, and a speed adjustment means including a manually operable knob, and a pointer movable thereby relative to the speed indicating scale, and means operable in the movement of said knob for tilting the fulcrum lever.

7. In an engine fuel control, the combination of a fuel control member, a governor housing, an engine driven centrifugal governor mechanism in said housing, an engine driven source of pressure fluid supply, a cylinder containing a regulator piston operatively connected with the fuel control member, a pilot valve arranged to be reciprocated by the governor mechanism to control the admission of fluid from said source to either end of said cylinder, linkage in said housing providing an operating connection between the governor mechanism and the pilot valve, the linkage including two interconnected, substantially parallel, tiltable fulcrum levers whereby the length of said connection may be varied according to the position of angularity of said fulcrum levers, manually adjustable means for tilting one of said levers for speed droop and speed adjustment and compensating mechanism in said housing for momentarily tilting the other fulcrum lever in timed relation to a control movement of the governor mechanism.

8. In an engine fuel control, the combination of a fuel control member, a governor housing, an engine driven centrifugal governor mechanism in said housing, an engine driven source of pressure fluid supply, a cylinder containing a regulator piston operatively connected with the fuel control member, a pilot valve arranged to be reciprocated by the governor mechanism to control the admission of fluid from said source to either end of said cylinder, means in said housing providing an operating connection between the governor mechanism and the pilot valve to reciprocate the latter in the control movements of the governor mechanism, a crank shaft in said housing, means whereby said shaft is turned in proportion to the movement of the fuel control member, a scale on the housing, a pointer movable relative to said scale, and means operated by the crank shaft for moving the pointer.

9. In an engine fuel control, the combination of a fuel control member, a governor housing, an engine driven centrifugal governor mechanism in said housing, an engine driven source of pressure fluid supply, a cylinder containing a regulator piston operatively connected with the fuel control member, a pilot valve arranged to be reciprocated by the governor mechanism to control the admission of fluid from said source to either end of said cylinder, means in said housing providing an operating connection between the governor mechanism and the pilot valve to reciprocate the latter in the control movements of the governor mechanism, a crank shaft in said housing, means whereby said shaft is turned in proportion to the movement of the fuel control member, a load limit scale on said housing, a manually adjustable knob, a pointer movable by means of said knob, a fulcrum lever adjustable as to elevation at its one end with the pointer in the adjustment of the latter, means whereby the other end of said lever is moved up and down in the turning of crank shaft, and a tappet for moving the pilot valve operated by an intermediate portion of the fulcrum lever.

10. In an engine fuel control, the combination of a fuel control member, a governor housing, an engine driven centrifugal governor mechanism in said housing, an engine driven source of pressure fluid supply, a cylinder containing a regulator piston operatively connected with the fuel control member, a pilot valve arranged to be reciprocated by the governor mechanism to control the admission of fluid from said source to either end of said cylinder, means in said housing providing an adjustable operating connection between the governor mechanism and the pilot valve, said means including a tiltable fulcrum lever, the angularity of which determines the length of the operating connection, a compensating crank shaft in said housing, means whereby said shaft is turned in proportion to the movement of the fuel control member, and means operated by said crank shaft in the rotation thereof for communicating tilting movement to said fulcrum lever, the last-mentioned means being adjustable in accordance with a desired speed droop whereby to change the amount of tilt communicated to the fulcrum lever for a given angular movement of the crank shaft.

11. A control as set forth in claim 10 including a speed droop scale on said housing, a manually adjustable knob, and a pointer movable by means of the manually adjustable knob relative to the speed droop scale on said housing, and means operable by the knob for adjusting the means in the housing tilting the fulcrum lever in the turning of the crank shaft in accordance with speed droop indicated by the pointer.

12. A governor comprising, in combination, means actuated in accordance with the speed of a prime mover, a servo motor having a reciprocable regulator piston, a pilot valve for said motor operatively connected with the first mentioned means to be shifted in accordance with speed changes, the connection including a tiltable fulcrum lever having three pivots, one moving with the first means and a second moving with the pilot valve, the third being normally stationary relative to the other two, a floating lever system including two interconnected levers one of which is connected with the third pivot to move the same, and two manual adjustments connected with said system, one of said manual adjustments being for speed adjustment and arranged to shift the lever directly connected with the third pivot, and the other manual adjustment being for speed droop adjustment and arranged to shift the other lever and thereby shift the companion lever and third pivot, and means whereby the floating lever system is moved with the regulator piston in accordance with the speed droop adjustment.

13. A governor comprising, in combination, means actuated in accordance with the speed of a prime mover, a servo motor having a reciprocable regulator piston, a pilot valve for said motor operatively connected with the first mentioned means to be shifted in accordance with speed changes, the connection including a tiltable fulcrum lever having three pivots, one moving with the first means and a second moving with the pilot valve, the third being normally stationary relative to the other two, manually operable means for shifting the third pivot, a shiftable abutment for limiting movement of the pilot valve in one direction, and a manually adjustable means for shifting said abutment.

14. A governor comprising, in combination, means actuated in accordance with the speed of a prime mover, a servo motor having a reciprocable regulator piston, a pilot valve for said motor operatively connected with the first mentioned means to be shifted in accordance with speed changes, the connection including a tiltable fulcrum lever having three pivots, one moving with the first means and a second moving with the pilot valve, the third being normally stationary relative to the other two, a floating lever system connected with the third pivot, and a manually adjustable means for shifting said system and pivot for speed droop adjustment.

15. A governor comprising, in combination, means actuated in accordance with the speed of a prime mover, a servo motor having a reciprocable regulator piston, a pilot valve for said motor operatively connected with the first mentioned means to be shifted in accordance with speed changes, the connection including a tiltable fulcrum lever having three pivots, one moving with the first means and a second moving with the pilot valve, the third being normally stationary relative to the other two, a floating lever system connected with the third pivot, a manually adjustable means for shifting said system and pivot for speed droop adjustment, a shiftable abutment for limiting movement of the pilot valve in one direction, and a manually adjustable means for shifting said abutment.

16. A governor comprising, in combination, means actuated in accordance with the speed of a prime mover, a servo motor having a reciprocable regulator piston, a pilot valve for said motor operatively connected with the first mentioned means to be shifted in accordance with speed changes, the connection including a tiltable fulcrum lever having three pivots, one moving with the first means and a second moving with the pilot valve, the third being normally stationary relative to the other two, a shiftable abutment adjacent the second pivot for limiting movement of the pilot valve in one direction, and a manually adjustable means for shifting said abutment.

17. A governor comprising a housing, a gear pump in the lower portion of said housing, a shaft driving one of the gears of said pump and extending downwardly from the housing for driving connection with a prime mover, another shaft extending upwardly in said housing from the other gear of said pump, a fly ball mechanism in the upper portion of said housing driven by said second shaft, a servo motor in the lower portion of said housing having a reciprocable regulator piston, a pilot valve controlling the flow of fluid from the pump to said motor, and means actuated by the fly ball mechanism for moving the pilot valve.

18. A governor comprising a housing, a gear pump in the lower portion of said housing, a shaft driving one of the gears of said pump and extending downwardly from the housing for driving connection with a prime mover, another shaft extending upwardly in said housing from the other gear of said pump, a fly ball mechanism in the upper portion of said housing driven by said second shaft, a servo motor having a reciprocable regulator piston, a pilot valve controlling the flow of fluid from the pump to said motor, means providing an operating connection between the fly ball mechanism and the pilot valve for shifting the latter in response to speed changes, said means including a tiltable fulcrum lever having three pivots, one moving with the fly ball mechanism, a second moving with the pilot valve, and a third normally stationary relative to the other two, and means including a manually operable knob extending from the wall of said housing for shifting the third pivot for speed adjustment of the governor.

19. A governor comprising a housing, a gear pump in the lower portion of said housing, a shaft driving one of the gears of said pump and extending downwardly from the housing for driving connection with a prime mover, another shaft extending upwardly in said housing from the other gear of said pump, a fly ball mechanism in the upper portion of said housing driven by said second shaft, a servo motor having a reciprocable regulator piston, a pilot valve controlling the flow of fluid from the pump to said motor, means providing an operating connection between the fly ball mechanism and the pilot valve for shifting the latter in response to speed changes, said means including a tiltable fulcrum lever having three pivots, one moving with the fly ball mechanism, a second moving with the pilot valve, and a third normally stationary relative to the other two, a floating lever system connected with the third pivot, and means including a manually adjustable knob projecting from the wall of said housing for shifting said system and pivot for speed droop adjustment of the governor.

20. A governor comprising a housing, a gear pump in the lower portion of said housing, a shaft driving one of the gears of said pump and extending downwardly from the housing for driving connection with a prime mover, another shaft extending upwardly in said housing from the other gear of said pump, a fly ball mechanism in the upper portion of said housing driven by said second shaft, a servo motor having a reciprocable regulator piston, a pilot valve controlling the flow of fluid from the pump to said motor, means providing an operating connection between the fly ball mechanism and the pilot valve for shifting the latter in response to speed changes, said means including a tiltable fulcrum lever having three pivots, one moving with the fly ball mechanism, a second moving with the pilot valve, and a third stationary relative to the other two, a shiftable abutment adjacent the second pivot for limiting movement of the pilot valve in one direction, and means including a manually adjustable knob projecting from the wall of said housing for shifting said abutment for load limit adjustment of the governor.

21. A governor comprising a housing, a gear pump in the lower portion of said housing, a shaft driving one of the gears of said pump and extending downwardly from the housing for driving connection with a prime mover, another shaft extending upwardly in said housing from the other gear of said pump, a fly ball mechanism in the upper portion of said housing driven by said second shaft, a servo motor having a reciprocable regulator piston, a pilot valve controlling the flow of fluid from the pump to said motor, means providing an operating connection between the fly ball mechanism and the pilot valve for shifting the latter in response to speed changes, said means including a tiltable fulcrum lever having three pivots, one moving with the fly ball mechanism, a second moving with the pilot valve, and a third normally stationary relative to the other two, two manually operable knobs extending from the wall of said housing for speed adjustment and speed droop adjustment of the governor respectively, means whereby the speed adjustment knob is arranged when adjusted to shift the third pivot directly, and other means whereby the speed droop adjustment knob is arranged when adjusted to shift the third pivot through a portion of the last-mentioned means.

22. A governor as set forth in claim 21, including a shiftable abutment adjacent the second pivot for limiting movement of the pilot valve in one direction, and means including a manually adjustable knob projecting from the wall of said housing for shifting said abutment for load limit adjustment of the governor.

23. A governor comprising a housing, a gear pump in the lower portion of said housing, a shaft driving one of the gears of said pump and extending downwardly from the housing for driving connection with a prime mover, another shaft extending upwardly in said housing from the other gear of said pump, a fly ball mechanism in the upper portion of said housing driven by said second shaft, a servo motor having a reciprocable regulator piston, a pilot valve controlling the flow of fluid from the pump to said motor, means providing an operating connection between the fly ball mechanism and the pilot valve for shifting the latter in response to speed changes, said means including a tiltable fulcrum lever having three pivots, one moving with the fly ball mechanism, a second moving with the pilot valve, and a third normally stationary relative to the other two, means including a manually operable knob extending from the wall of said housing for shifting the third pivot for speed adjustment of the governor, a shiftable abutment adjacent the second pivot for limiting movement of the pilot valve in one direction, and means including a manually adjustable knob projecting from the wall of said housing for shifting said abutment for load limit adjustment of the governor.

24. A governor comprising a housing, a gear pump in the lower portion of said housing, a shaft driving one of the gears of said pump and extending downwardly from the housing for driving connection with a prime mover, another shaft extending upwardly in said housing from the other gear of said pump, a fly ball mechanism in the upper portion of said housing driven by said second shaft, a servo motor having a reciprocable regulator piston, a pilot valve controlling the flow of fluid from the pump to said motor, means providing an operating connection between the fly ball mechanism and the pilot valve for shifting the latter in response to speed changes, said means including a tiltable fulcrum lever having three pivots, one moving with the fly ball mechanism, a second moving with the pilot valve, and a third normally stationary relative to the other two, a floating lever system connected with the third pivot, means including a manually adjustable knob projecting from the wall of said housing for shifting said system and pivot for speed droop adjustment of the governor, a shiftable abutment adjacent the second pivot for limiting movement of the pilot valve in one direction, and means including a manually adjustable knob projecting from the wall of said housing for shifting said abutment for load limit adjustment of the governor.

ELMER E. WOODWARD.